P. P. WOODS.
AUTOMATIC ELASTIC CHECK VALVE FOR PNEUMATIC TIRES.
APPLICATION FILED MAY 2, 1911.
1,041,216.
Patented Oct. 15, 1912.
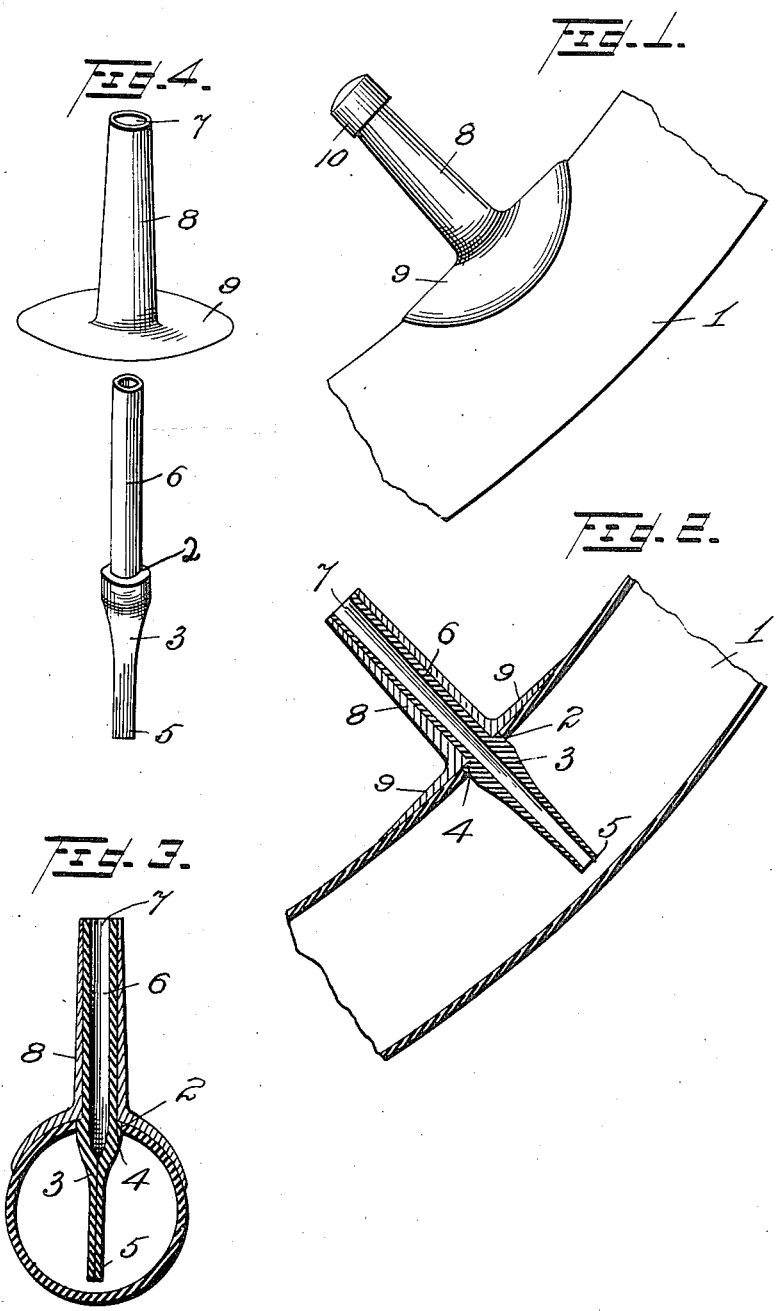
Witnesses
Inventor
PINKNEY P. Woods
By John S. Duffie
Attorney

UNITED STATES PATENT OFFICE.

PINKNEY P. WOOD, OF HOT SPRINGS, ARKANSAS.

AUTOMATIC ELASTIC CHECK-VALVE FOR PNEUMATIC TIRES.

1,041,216.   Specification of Letters Patent.   Patented Oct. 15, 1912.

Application filed May 2, 1911. Serial No. 624,545.

*To all whom it may concern:*

Be it known that I, PINKNEY P. WOOD, a citizen of the United States, residing at Hot Springs, in the county of Garland and State of Arkansas, have invented certain new and useful Improvements in Automatic Elastic Check-Valves for Pneumatic Tires, of which the following is a specification.

This invention has relation to new and useful improvements in automatic elastic check valves for pneumatic tires, and the main objects thereof are to check the outward rush of air after being pumped into the tire by means of a valve that is elastic, simple in construction, efficient in operation and durable.

A further object of my invention is to provide an efficient plug for closing up punctures that might appear in a pneumatic tire.

With the foregoing and other objects in view my invention consists in the novel features of construction, combination and arrangement of parts as are described in this specification, illustrated in the accompanying drawings, forming a part thereof, and particularly pointed out in the appended claim.

Reference being had to the drawings: Figure 1 is a perspective view of a segment of a pneumatic tire to which my invention has been applied. Fig. 2 is a central, vertical, sectional view of Fig. 1. Fig. 3 is a vertical, transverse, sectional view of a pneumatic tire taken centrally through my valve as applied thereto, said tire being inflated, said valve being in closed position. Fig. 4 is a perspective view of a tubular member which is secured to the outer surface of the tire and forms a reinforced member and valve stem, said valve being illustrated immediately below said reinforcing member.

Referring more particularly to the drawings, in which like numerals designate like parts throughout, my invention is described as follows:

The pneumatic tire 1, is provided with an opening 2, through its inner wall which receives the elastic valve 3, said valve is provided about midway of its length with a shoulder 4, the lower end of said valve being collapsible and tapering nearly to a point, the upper face of said shoulder being on an exact line with the outer surface of the tire, and the valve at this point exactly fits in the opening 2, of the tire, said valve 3, is tapered from its shoulder 4, to its inner end 5, so that the air when pumped into the tire will easily close the inner end of the valve as illustrated in Fig. 3. The valve stem 6, which consists of the part from the shoulder 4, to the outer end 7, is of uniform diameter.

Encircling the stem is a tubular reinforcing member 8, and provided integral therewith is a flange 9. Said reinforcing member is preferably made of rubber, the flange 9, of said reinforcing member is vulcanized to the outer surface of the tire when the valve is placed in position. The shoulder 4, comes squarely up against the shoulder of the flange and the reinforcing tube and therefore it cannot work up or out of the tire or of the reinforcing tube but is, by means of its shoulder and the shoulder of the reinforcing tube and its flange, held firmly down in place. On the outer end of the reinforcing member 8, may be secured in any substantial way a cap 10, said cap is obviously for the purpose of preventing dust or grit from entering the valve after the pneumatic tire has been inflated.

Although I have specifically described the novel features of construction, combination and arrangement of parts of my invention, yet I reserve and may exercise the right to make such changes therein as do not depart from the spirit of the invention or the scope of the appended claim.

Having described my invention what I claim as new and desire to secure by Letters Patent, is:

In combination with a pneumatic tire provided through its inner wall with an opening, a valve consisting of a hollow stem and provided about midway its length with a shoulder, said shoulder fitting into said opening, the lower end of said valve being collapsible and tapering nearly to a point, the upper wall of said shoulder being on a line with the outer surface of said tire, the outer part or stem of said valve being of uniform size, a reinforcing member fitting around said stem and extending from the upper end thereof down to and fitting on the shoulder of said valve, a flange integral with and extending outwardly from the lower end of said reinforcing member and vulcanized to said tire.

In testimony whereof I affix my signature in presence of two witnesses.

PINKNEY P. WOOD.

Witnesses:
C. E. SPARKS,
L. CAMPBELL.